Feb. 7, 1950     J. RABINOW     2,496,310
REVERSING ACCELERATION INTEGRATOR
Filed March 19, 1946     2 Sheets-Sheet 1
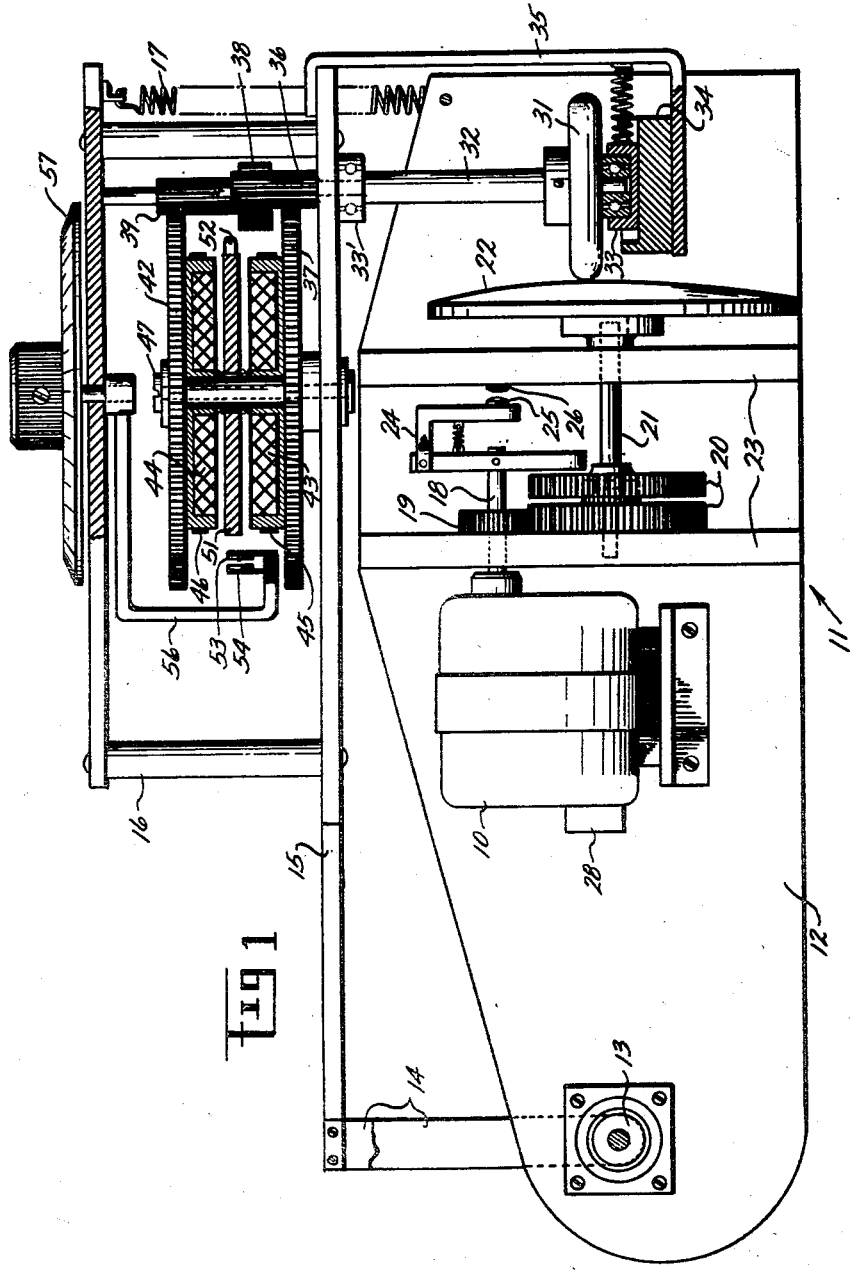
INVENTOR.
JACOB RABINOW
BY
ATTORNEYS Feb. 7, 1950   J. RABINOW   2,496,310
REVERSING ACCELERATION INTEGRATOR
Filed March 19, 1946   2 Sheets-Sheet 2
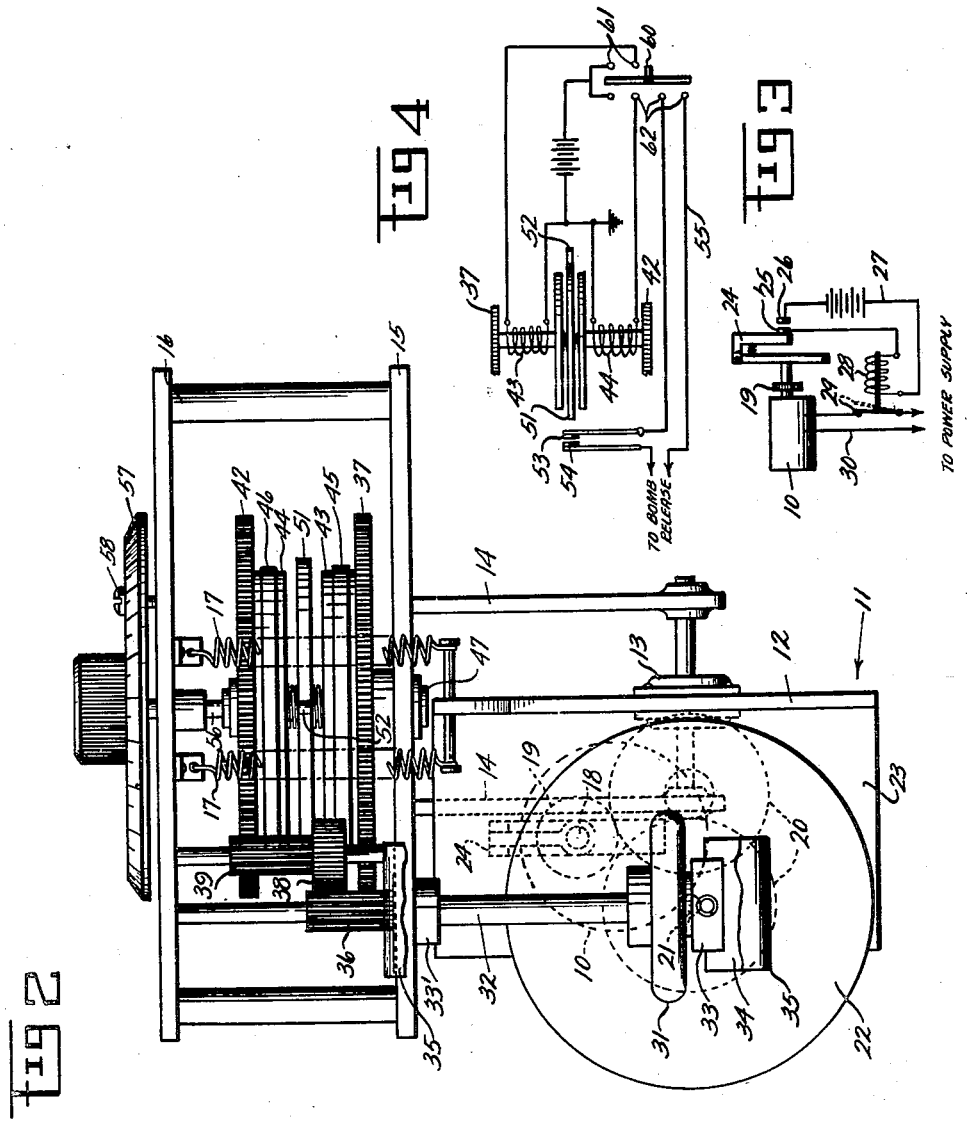
INVENTOR.
JACOB RABINOW Patented Feb. 7, 1950

2,496,310

UNITED STATES PATENT OFFICE 2,496,310

REVERSING ACCELERATION INTEGRATOR

Jacob Rabinow, Takoma Park, Md., assignor to the United States of America as represented by the Secretary of War Application March 19, 1946, Serial No. 655,539

8 Claims. (Cl. 161—1)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an improved reversing acceleration integrator, and it finds particular utility as a timing device in bombing technique, wherein it is essential to determine the time of release of a bomb as a function of the vertical velocity of the aircraft.

An object of this invention is to provide an accelerating integrator whereby no external time measuring equipment is necessary, and the operation of the device is independent of the motor speed as long as that speed is held substantially constant during the cycle of operation.

Another object of this invention is to provide such an integrating accelerometer which is arranged so as to find particular utility in bombing operations and to provide for an inherent correction for various angles of attack by the attacking plane, and which provision is preferably accomplished by making the pre-setting of the bomb releasing circuit switch a certain function of the angle of flight.

Another object of this invention is to provide such a device which is essentially a self-setting integrator whereby the setting operation is performed during the straight forward movement of the aircraft which carries the device, and prior to the pull-up of the aircraft.

These and various other objects and advantages are attained with this invention, as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 1 is a side elevational view of this invention, being shown partly in section.

Fig. 2 is an end view thereof, but the gear pinions and the swingable frame with integrating mechanism being shown therein as shifted toward the lefthand side of said figure.

Figs. 3 and 4 are diagrammatic views illustrating the electric wiring for the motor circuit and for the acceleration responsive circuit, respectively.

This invention, in the form disclosed in the drawings, comprises a driving member 10 which is preferably a direct current motor mounted on a frame 11 including a vertically extending plate 12 whereon the motor is secured. This plate is pivotally supported adjacent one end by bearing means 13 carried on legs 14 depending from a horizontal plate 15 of a supporting member or cage 16. Said cage is mounted stationary on the aircraft with which this device is utilized. Springs 17 are used to support the other end of said plate 12 and frame 11 in proper position on the cage 16, thereby permitting slight vertical swinging movement to the frame 11 on its pivot 13, relative to the cage 16, due to forces of acceleration acting on this device.

The driving motor 10 carries on its shaft 18 a pinion 19 which drives a train of reducing gears 20 and thereby drives a shaft 21 carrying a disc 22 which rotates in a vertical plane, said shafts and gears being supported in plates 23 extending laterally from the plate 12. The shaft 18 also carries a governor 24 for controlling the speed of the motor by means of a pair of switch contacts 25 and 26 in the circuit 27 of a relay 28, said relay being utilized to control the current supplied to the motor and thus regulate its speed, as by opening a switch 29 in a power supply circuit 30 of the motor when the motor speed becomes excessive.

A wheel 31 is mounted on a shaft 32 supported by bearings 33 and 33', said bearing 33 being supported for sliding movement in a block 34 mounted on a bar 35 which depends from plate 15, and said bearing being spring held to retain the wheel in peripheral contact with the face of disc 22. The wheel 31 normally engages the face of disc 22 radially outward from the axis of rotation of the disc; and thus, by vertical movement of plate 12 relative to cage 16, due to upward acceleration force applied to said cage, said wheel is adapted to shift radially of the face of the disc while being driven, thereby providing a variable speed friction drive. Mounted integrally on shaft 32 is a pinion 36 which meshes with a large timing gear 37 and also with a small gear 38. Said gear 38 has another pinion 39 integral therewith which drives a large timing gear 42, similar to timing gear 37 and spaced thereabove but rotary in a reverse direction.

Secured to the timing gears 37 and 42 are two electromagnetic clutches 43 and 44, respectively. The current to the clutches is supplied through suitable slip rings 45 and 46 provided with the usual wiping contacts or other suitable current conveying means. The clutches are rotatable on a shaft 47 which is mounted stationary on plate 15. Mounted freely or floatingly between the two clutches 43 and 44 is a disc of magnetic material or core 51 having a contact making element or finger 52 projecting therefrom which is operable for bringing together the contact elements 53 and 54 of the timing switch, thereby closing said switch and the circuit 55 for actuating the bomb release mechanism or other mechanism timed by this device.

It should be noted that the two clutches 43 and 44 will revolve in opposite directions and at a ratio of speed determined by the pinions and gears 36 to 42. The switch contacts 53 and 54 are carried by an adjustable arm 56 which is mounted on cage 16 and its position and angular adjustment is controlled by a control dial 57 connected to the arm 56 and adjustable on the cage 16, said dial being held frictionally in position by screws 58.

The operation of the device as a clock and acceleration integrator is substantially as follows:

When the motor circuit is closed by the pilot or operator and its speed becomes excessive, then governor 24 moves contact element 25 over to element 26 to close circuit 27 and operate relay 28 to open switch 29 of the motor circuit 30. This breaking of the supply circuit to the motor slows down the motor until contacts 25 and 26 are again separated to break the relay circuit 27, thus serving to keep the speed of the motor constant.

At the beginning of this action, the finger 52 of magnetic core 51 is adjacent to the switch contacts 53 and 54. As the disc 22 rotates, it imparts rotation to the wheel 31 and, through the pinions and the gears 37 and 42 actuated by the shaft 32, drives either one of the electromagnetic clutches 43 or 44. Simultaneously with the starting of the motor the first clutch 43 is energized by the operator by actuating switch means 60 and closing its switch 61, and this attracts the armature core 51, thereby rotating the core along with the clutch 43 and moving finger 52 away from contacts 53 and 54, leaving the circuit 55 open. As long as the operator continues to keep the switch 61 closed, this action continues and the finger 52 separates from contact 53 by a constantly growing arc. When the pilot observes that he is say one-third nearer to the target, he then actuates the switch means 60 to close switch 62 and open the first switch 61, just as he starts his plane on the pull-up, thereby de-energizing the clutch 43 and energizing clutch 44, and the core 51 is consequently snapped upward from clutch 43 toward clutch 44 and begins to be retracted by turning in the opposite direction. The finger 52 now begins to approach the contact element 53 to move it over to contact element 54 for closing the circuit 55 to the bomb release or to the mechanism that is being timed.

Where this device is used for timing the bomb release, and when the pilot continues his plane on a straight course, the bomb releasing switch would be closed just as the pilot collides with the target. These contacts and the finger 52 on core 51 therefore, are especially positioned and adjusted to close the circuit 55 for releasing the bomb, and the relative speed of the clutches are set, so as to provide the proper bomb releasing result. During such a flight, if the second switch 62 is closed when the pilot is one-third of the distance to the target, the relative speed of the clutches 43 and 44 should be two to one. As the pilot pulls up after actuating the second switch, the acceleration perpendicular to the line of flight will cause the frame 11 to swing downward, thereby moving the center of disc 22 downwardly away from the periphery of wheel 31, thus increasing the radius of the frictional contact the wheel 31 upon disc 22 and increasing relatively the speed of the wheel 31. This acti decreases the time required for finger 52 to clc the release switch 53, 54. The mechanism mor over can be arranged by the use of the springs to give a time function of this action to approx mate the ideal function within a few per cei Herein, one of these springs 17 can also be s so as not to act until a value of approximate 1.5 g's is reached during the pull-up period.

It may be noted that under the conditions vertical acceleration, the position of the point contact of wheel 31 with disc 22, radially outwar from the axis of rotation of the disc, is a measu of the instant value of acceleration. Also, sin disc 22 is rotated at a substantially consta speed, the angle of rotation of shaft 32 will equal to the integral of the acceleration wi respect to time, which in turn is a measure of tl instant vertical velocity of the aircraft on whic this device is utilized. It is thus apparent th this device performs the function of a clock ar also of an acceleration integrator.

I claim:

1. An acceleration integrating and timing d vice comprising means providing rotation at sut stantially constant velocity, a movable elemen means for interconnecting said first means an said element to initiate movement of the latte in one direction at a selected instant, intercor necting means for reversing the movement of sai element at a later selected instant, acceleratio responsive means for modifying the velocit transmitted to said element by said first mear and switch means operable when said elemer has completed its reverse movement.

2. An acceleration integrating and timing de vice comprising means providing rotation at sub stantially constant velocity, a movable elemen means for interconnecting said first means an said element to initiate movement of the latter i one direction at a selected instant, interconnect ing means for moving said element in a directio reversed to the first and at a speed bearing fixed relation to that of said element in the firs direction, acceleration responsive means for modi fying the velocity transmitted to said element b said first means and switch means operable wher said element has completed its reverse movement 3. An acceleration integrating and timing device comprising means providing rotation at sub stantially constant velocity, a rotatable element means for interconnecting said first means anc said element to initiate movement of the latter in one direction at a selected instant, interconnecting means between said first means and saic element for reversing the movement of the latter and including acceleration responsive means for modifying the velocity transmitted to said element by said first means and switch means operable when said element has completed its reverse movement.

4. In an acceleration responsive device of the character described, a support, a frame pivotally mounted on said support, a control spring for yieldingly restraining said frame against pivotal movement due to forces of acceleration, a friction disc rotatably mounted on said frame, a constant speed driving means for said disc, said disc being movable with the frame in a plane parallel to the plane of the applied acceleration force, a roller rotatably mounted on the support and having its periphery engaging said disc over a varying minimum to maximum radius range of said disc as said frame is pivoted from its position of minimum to maximum control spring tensioning to form a variable speed friction drive, said roller being positioned offcenter with respect to the axis of rotation of said disc when the latter is in a predetermined neutral position so that the roller is driven at a substantially constant speed when acceleration forces are zero and the speed of the roller being increased upon displacement of the frame from the neutral position due to acceleration forces acting thereon, cooperative contacts mounted on said support, a rotatable contact making element mounted on said support adapted to actuate said contacts, a reversible drive connected to said element for rotating the same away from and toward the contact engaging position, and means for selectively coupling said roller to said reversible drive.

5. An acceleration integrating and timing device comprising a support, a frame mounted on said support to be movable thereon by acceleration forces, spring means for restraining said frame against movement on said support due to forces of acceleration, a driving disc on the frame and movable therewith having its face in a plane parallel to the line of movement of said frame, constant speed driving means for rotating the disc, a wheel carried by the support and having peripheral contact with the face of said disc in all positions throughout the movement of said frame wherein the radial zone of contact on said disc varies to form a variable speed drive, said wheel normally engaging said disc offcenter to rotate at a certain speed and to increase the speed upon displacement of the frame relative to the support due to acceleration forces, contacts mounted on said support, rotary means on the support carrying a contact making element, and operative connection between said wheel and said rotary means including electromagnetic clutch means operative for selectively changing the direction of rotation of said rotary means for actuating said rotary means to move said element away from and toward contact making position.

6. An acceleration integrating and timing device comprising a support having a control member thereon, a switch whose position is controlled by said member, a frame swingably mounted on said support, spring means proportioned to hold the frame in proper elevated position on the support while acceleration forces are zero, a wheel mounted on the support, a disc mounted on the frame being driven at a constant speed and having its face drivingly engaging the periphery of said wheel, said disc being movable along a radius relative to the wheel to vary the radius of contact of said wheel on said disc to form a variable speed driving transmission the ratio of which is governed by the vertical position of the disc relative to the wheel due to the acceleration forces acting thereon, rotary means on said support being driven by said wheel and carrying an element to be movable away from and toward a position to close said switch, electromagnetic means in the associated driving means between said rotary means and said wheel operable for actuating said rotary means in a selected rotative direction to carry said element first away from and then toward the switch-closing position.

7. An acceleration integrating and timing device comprising a support carrying thereon a switch and means for controlling the position of the switch, a frame pivotally mounted on said support for vertical movement, spring means proportioned to hold the frame in proper elevated position on the support while forces of acceleration are zero, a wheel mounted on the support, a motor driven disc on the frame having its face drivingly engaging the periphery of said wheel and being shiftable vertically thereof due to acceleration forces, thus forming a variable speed driving transmission the ratio of which is governed by the vertical position of the frame and the disc relative to said wheel due to forces of acceleration, a pair of spaced timing members on said support being driven by said wheel in opposite directions to one another, an electromagnet on each timing member and having therebetween a floating core which carries a switch operating element, means operable for energizing either electromagnet selectively, one to actuate said core and move its element away from the switch closing position and the other to actuate said core and return said element to close said switch.

8. An integrating accelerometer and timing device comprising a supporting cage having a control dial and associated means thereon carrying a timing switch adjustable by said dial, a frame having one end pivotally supported for vertical swinging movement on said cage, spring means at the other end of the frame being proportioned to retain the frame in retracted position while the cage is moving in a horizontal plane, a disc mounted in a vertical plane on the frame and means for driving said disc at a substantially constant speed, a wheel carried by the cage and having peripheral engagement with the face of the disc, said wheel engaging said face offcenter when acceleration forces are zero and being movable outwardly on said face by displacement of the frame due to applied forces of acceleration, a pair of timing gears mounted spaced apart on the cage, gear means actuated by said wheel for driving one of said timing gears contra to the other and at a different speed, a pair of magnetic clutches spaced apart, one secured to each of said gears, having a core mounted therebetween provided with a finger, and means operable for selectively actuating either one of said pair of magnetic clutches, one first to move said core and swing said finger away from its switch-closing position and then the other to return the core and finger to close said switch, whereby the rate of rotation of said wheel and thereby of said timing gears is proportional to the upward acceleration of said device to provide controlled timing for closing said switch.

JACOB RABINOW.

REFERENCES CITED

The following references are of record in the file of this patent:

UNITED STATES PATENTS

| Number | Name | Date |
|---|---|---|
| 1,463,919 | Clingman | Aug. 7, 1923 |
| 1,575,010 | Scheer | Mar. 2, 1926 |
| 1,600,753 | Boardman | Sept. 21, 1926 |
| 1,763,509 | Gates | June 10, 1930 |
| 1,772,593 | Robertson | Aug. 12, 1930 |
| 2,089,878 | Corbin | Aug. 10, 1937 |
| 2,130,414 | Bowles | Sept. 20, 1938 |
| 2,388,686 | Habig | Nov. 13, 1945 |